United States Patent
McCormack

[11] 3,805,074
[45] Apr. 16, 1974

[54] SPECTRAL SCAN AIR MONITOR
[75] Inventor: Kent McCormack, Richardson, Tex.
[73] Assignee: Texas Instruments Incorporated, Dallas, Tex.
[22] Filed: Jan. 2, 1973
[21] Appl. No.: 320,401

[52] U.S. Cl................. 250/355, 250/339, 250/343
[51] Int. Cl............................................... G01j 3/08
[58] Field of Search ........... 250/338, 339, 344, 345, 250/346, 355

[56] References Cited
UNITED STATES PATENTS

| | | | |
|---|---|---|---|
| 3,465,143 | 9/1969 | Doonan | 250/339 |
| 3,180,984 | 4/1965 | Fentig et al. | 250/355 |
| 2,938,118 | 5/1960 | Martin | 250/345 |
| 2,547,212 | 4/1951 | Jamison et al. | 250/343 |
| 2,904,687 | 9/1959 | Sobcou et al. | 250/354 |

*Primary Examiner*—Archie R. Borchelt
*Assistant Examiner*—B. C. Anderson

[57] ABSTRACT

An apparatus for monitoring air pollution sources, such as, for example nitrous oxide (NO), sulphur dioxide ($SO_2$), or sulphur trioxide ($SO_3$) is disclosed. The apparatus includes a tunable diode laser as a transmitter of infrared energy. The diode laser is tuned in a periodic fashion such that the laser light emission wavelength is scanned through an absorption line of a pollutant gas. The tuning effect is produced by driving the diode laser with a current which is the sum of a d.c. and an a.c. current. The laser energy is transmitted to a beamsplitter. The beam-splitter divides the energy between a sample path and a reference path. The sample path may be an open air path or include a sample cell; the reference path contains a cell having a known concentration of the pollutant gas being monitored. A chopper is provided to alternately sample the radiation passing the sample and reference cells to a detector which produces an a.c. signal whose peak to peak difference value contains the information of the difference in concentration levels of the contaminant in the reference and sample paths. A feedback circuit is provided to feed-back a d.c. current, equivalent to the time difference between the offset in the center point of the diode emission and the center of the contaminant absorption line, to the laser drive circuit to provide automatic lock onto the center of the contaminant absorption line.

8 Claims, 10 Drawing Figures

SPECTRAL SCAN AIR MONITOR

This invention relates to pollutant monitoring systems and more particularly to an improved infrared apparatus for monitoring air pollution.

In the past pollutant monitoring systems have utilized light absorption and light scattering techniques. Generally speaking the light absorption technique is appropriate for use where the subject to be monitored is readily accessible thereby permitting either the monitoring apparatus to be placed within the subject or the taking of samples thereof for use in the monitoring system. The light scattering technique is appropriate for use in monitoring remote subjects which are inaccessible or difficult to reach for employing light absorption type devices. In either of these two systems lasers have been used as the sources.

Problems with either light absorption or scattering systems exist in acquiring lock and in eliminating signal distortion resulting from their large dynamic range.

Accordingly, it is an object of this invention to provide a compact, safe, and reliable field type pollution monitoring system suitable for mass production.

Another object of the invention is to provide a pollution monitoring system having automatic lock-on capability.

Still another object of the invention is to provide a pollution monitoring system having a reduced dynamic range requirement for the signal processor.

Yet another object of the invention is to provide a pollution monitoring system having an increased signal to correlated noise-ratio.

In carrying out this invention in one illustrative embodiment thereof, a light transmitted such as, for example, a tunable laser diode is tuned to the absorption linewidth of a source of pollutant. The tuned beam is split by a beamsplitter into separate paths. One path includes a reference cell, containing a pollutant of known concentration; another path includes either a sample cell containing an unknown quanity of the subject, or an open air path containing an unknown quantity of the subject. In the first case the unknown quantity is determined by absorption. In the latter case the unknown quantity is determined by absorption (corner reflector is used) or by scattering. The effect of the sample on the light source is determined by a detector which alternately samples the radiation from the two paths and generates an a.c. signal. The peak to peak value of the a.c. signal for the case of absorption is determined by the following formula:

$$V(\lambda) = R[P_s(\lambda) - P_R(\lambda)]$$
$$= RP(\lambda)\{\exp[-a(\lambda)C_s - a_pC_p - a_a(\lambda)C_a] - \exp[-a(\lambda)C_R]\}$$

where $\lambda$ = the laser emission wavelength
$R$ = Responsivity
$P_s$ = Power received from sample path
$P_R$ = Power received from reference path
$a(\lambda)$ = pollutant absorption coefficient at $\lambda$
$C_s$ = Number of pollutant molecules in sample path
$C_R$ = Number of pollutant molecules in reference path
$a_p$ = particulate absorption coefficient
$C_p$ = Number of particulates in sample path
$a_a(\lambda)$ = absorption coefficient at $\lambda$ due to interfering absorbers in sample path such as water vapor
$C_a$ = Number of absorbers in sample path with $a_a(\lambda)$ The peak to peak signal is demodulated to a d.c. value for $\lambda$. The value of $\lambda$ is changed in a periodic fashion such that $V(\lambda)$ is a slow varying periodic value. This signal is differentiated in a signal processor and processed through a peak detector to determine the peak amplitude of the differentiated voltage. The peak amplitude is proportional to the difference in absorption strengths of the contaminant in the reference and sample paths. The output peak amplitude is an input to a meter and to a feedback circuit. The feedback circuit includes a time difference unit comprising clock circuits in which the time from the initiation of a cycle of the periodic scan to the occurrence of peak of the differentiated signal is compared to the time from the occurrence of the peak of the differentiated signal to the completion of the cycle. The time difference, which is a measure of the offset in the center point of the wavelength scan of the tuned laser from the center of the contaminant absorption line, is converted to a d.c. signal and applied to the laser power source to automatically adjust the center of the laser line for locking purposes. The meter is calibrated to display the concentration of the pollutant in the sample.

The invention together with further objects and advantages thereof, may best be understood by reference to the following detailed description taken in conjunction with the accompanying drawings.

Figure 6A:
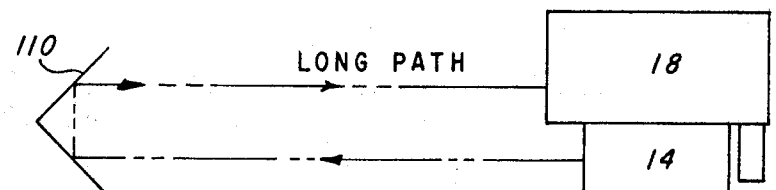
Figure 6B:
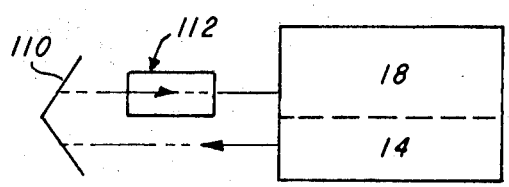
Figure 6C:

FIGS. 6A and B are additional configurations for closed path units;

FIGS. 6C and D are additional configurations for open path units; and

Figure 7:
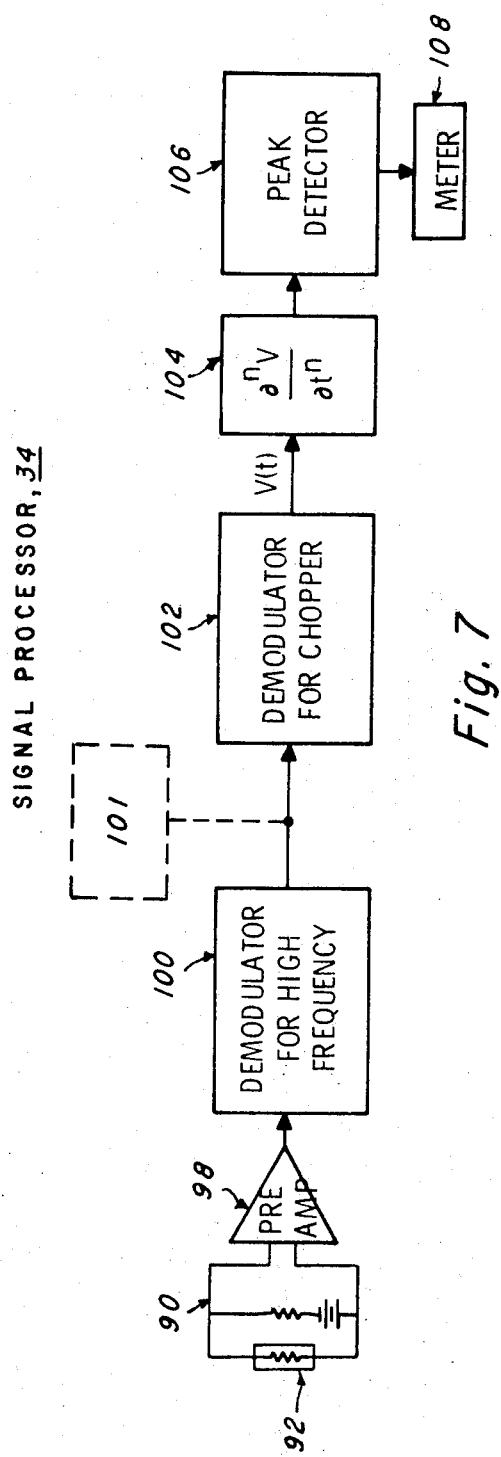

FIG. 7 is a block diagram of the detector and signal processor for the pollution monitoring system.

Referring to the drawings, there is shown (FIG. 1) a pollution monitoring device 10 comprising an electrical current source 12 for producing a drive current for a light transmitter 14. The light transmitter 14 may be, for example, a tunable diode laser which for the detection of the pollutant nitrous oxide (NO) may be constructed of lead, germanium, telluride (Pb,Ge)Te. Light from the tunable diode laser 14 is divided by a beamsplitter 62; one portion forms a reference path 64 through a reference cell 72 to a light chopper 76, and another portion forms a sample path 66 through either a sample cell 84 or an open air sample to the light chopper 76. The chopper 76 alternately samples by interrupting light at the ends of the reference and sample paths for a detector 90. The detector 90 is responsive to the detected light to produce electrical representations for a signal processor 34. Outputs of the signal processor are applied to a meter 108 calibrated to display the concentration of the contaminant and to a time difference unit 26 to produce a d.c. feedback signal to provide lock onto the center of the absorption line of the contaminant.

The electrical current source 12, hereinafter referred to as the diode laser drive circuit (FIG. 2), produces an electrical current comprised of two parts which are inputs to a summing amplifier 16. One part is d.c. obtained from d.c. source 19; the other part is a triangular wave produced by a low frequency oscillator 20 having its input coupled to a source of electrical power (not shown) and its output applied to a triangular wave generator 22. The d.c. output is fixed at a level which centers the emission wavelength ($\lambda$) of the light transmitter 14 at the center of a contaminant absorption line, and the amplitude of the triangular wave is fixed to cause the emission wavelength ($\lambda$) of the laser diode 14 to change in a linear fashion in time back and forth through the absorption band.

Figure 2:
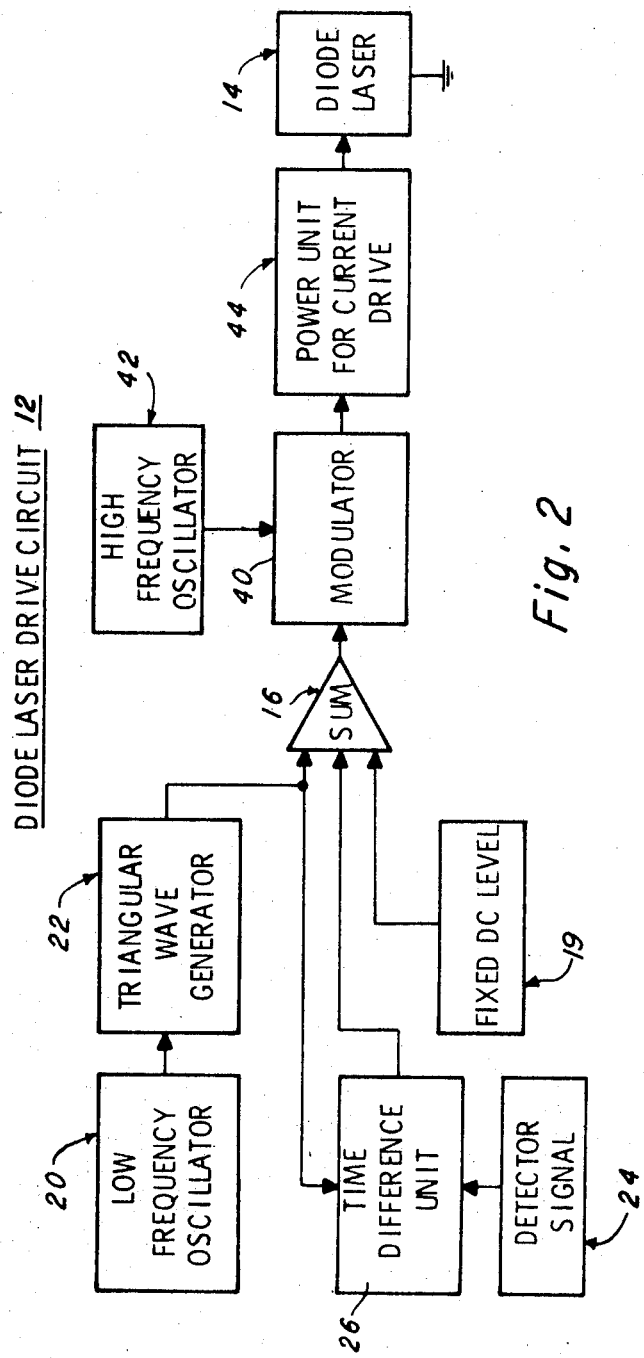
FIG. 2 is a block diagram of the diode laser drive circuit for the pollution monitoring system.
Figure 3:
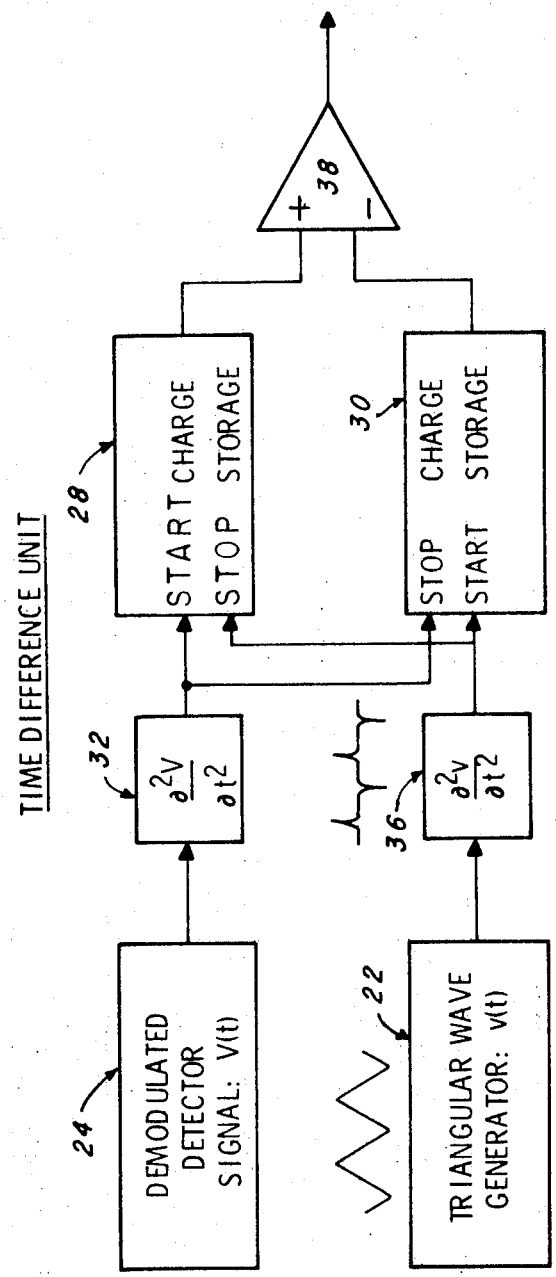
FIG. 3 is a block diagram of the time difference unit used to control lock onto the center of the desired absorption line.

It has been found difficult to hold an absorption line at a desired value in a field environment. Thus, to lock the system onto the center of the contaminant absorption line, a portion of the system's electrical output 24 generated by a light detector, hereinafter described, is compared to a portion of the triangular wave generator's output. The comparison is made in a time difference unit 26 and the d.c. output thereof is applied as a d.c. correction feedback input to the summing amplifier 16. The time difference unit 26 (FIG. 3) comprises two clocks 28 and 30, which may be, for example two J-K flip-flops. Clock 28 receives a pulse as a start pulse and clock 30 receives the same pulse as a stop pulse; the pulse is obtained from a first differentiator 32 and is indicative of the second derivative of the demodulated detector signal [$V(t)$] 24, of a detector signal processor 34, hereinafter described. Further, clock 28 receives a pulse as a stop pulse and clock 30 receives the same pulse as a start pulse from a second differentiator 36 indicative of the second derivative of the triangular wave output [$V(t)$] from the triangular wave generator 22. The peak and null points of the triangular wave generator are used for the opposing functions of the two clocks 28 and 30. The clock outputs are fed as inputs to a difference amplifier 38; the difference in time is equivalent to the offset in the center point of the diode emission from the center of the contaminant absorption line. The d.c. output of the difference amplifier 38 is the d.c. correction applied to the summing amplifier 16 (FIG. 2).

The output of the summing amplifier 16 is applied to a modulator or mixer 40 where it is modulated with the output of a local high frequency oscillator 42 in an "on-off" fashion. The modulated output of the modulator 40 is applied to a power amplifier stage 44 which acts as a power unit to develop the current to drive the light transmitter 14.

Figure 4:
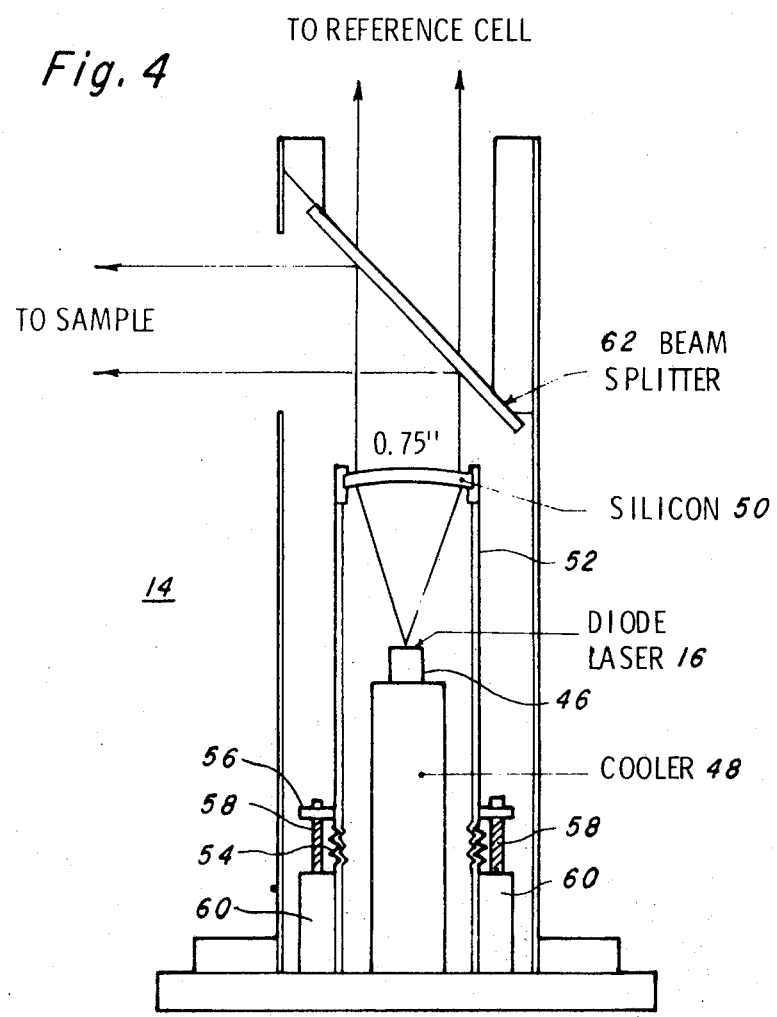
FIG. 4 is a side view taken partly in section of the diode laser transmitter for the pollution monitoring system.

The light transmitter 14 (FIG. 4) comprises a diode laser 14 mounted upon a coldfinger 46 of an open cycle cooler 48 powered by a bottle of liquid nitrogen or a closed cycle cooler (not shown). As a diode laser has a large divergence angle ($\approx 40°$) owing to the small area of the emitting junction, a fast optical system (low $f$ number) is required to obtain efficient use of the diode as a source. A refractive element 50 is used to obtain the low $f$/number and is used in place of a window for the dewar vacuum jacket 52. The dewar vacuum jacket 52 has a bellows portion 54 intermediate the base of the dewar jacket and a pair of ears 56 secured to the body of the vacuum jacket above the bellows section.

The ears 56 have threaded apertures to receive screws 58 mounted in blocks 60. The screws 58 may be rotated to adjust the height of the dewar jacket and thus the distance between the refractive element 50 and the diode laser 14. The refractive element may be, for example, a silicon lens having a diameter of about 0.75 inch, and it is adjusted to correct for spherical aberrations to obtain good collimation of the light emitted by the diode laser 14. A beamsplitter 62 (FIGS. 1 and 4) is positioned in the light path of the diode laser 14 to divide the collimated light into a reference cell path 64 and a sample path 66 of a receiver 18.

The receiver 18 may include (FIG. 5) a reflecting mirror 68 mounted in the reference cell path 64 to reflect light passing through the beamsplitter through a refractive element 70 having an aperture of about 1.0 inch and a high $f$/number (7.5), and a reference cell 72 to the reflective surface of another mirror 74. The mirror 74 reflects light passing through the reference cell 72 to a chopper 76. The reference cell 72 (FIGS. 1 and 5) may be constructed of any suitable transparent material, such as for example, silicon. A pollutant or contaminant such as, for example, nitrous oxide (NO), sulfur dioxide ($SO_2$) or sulfur trioxide ($SO_3$) of known concentration is sealed in the reference cell 72.

Figure 5:
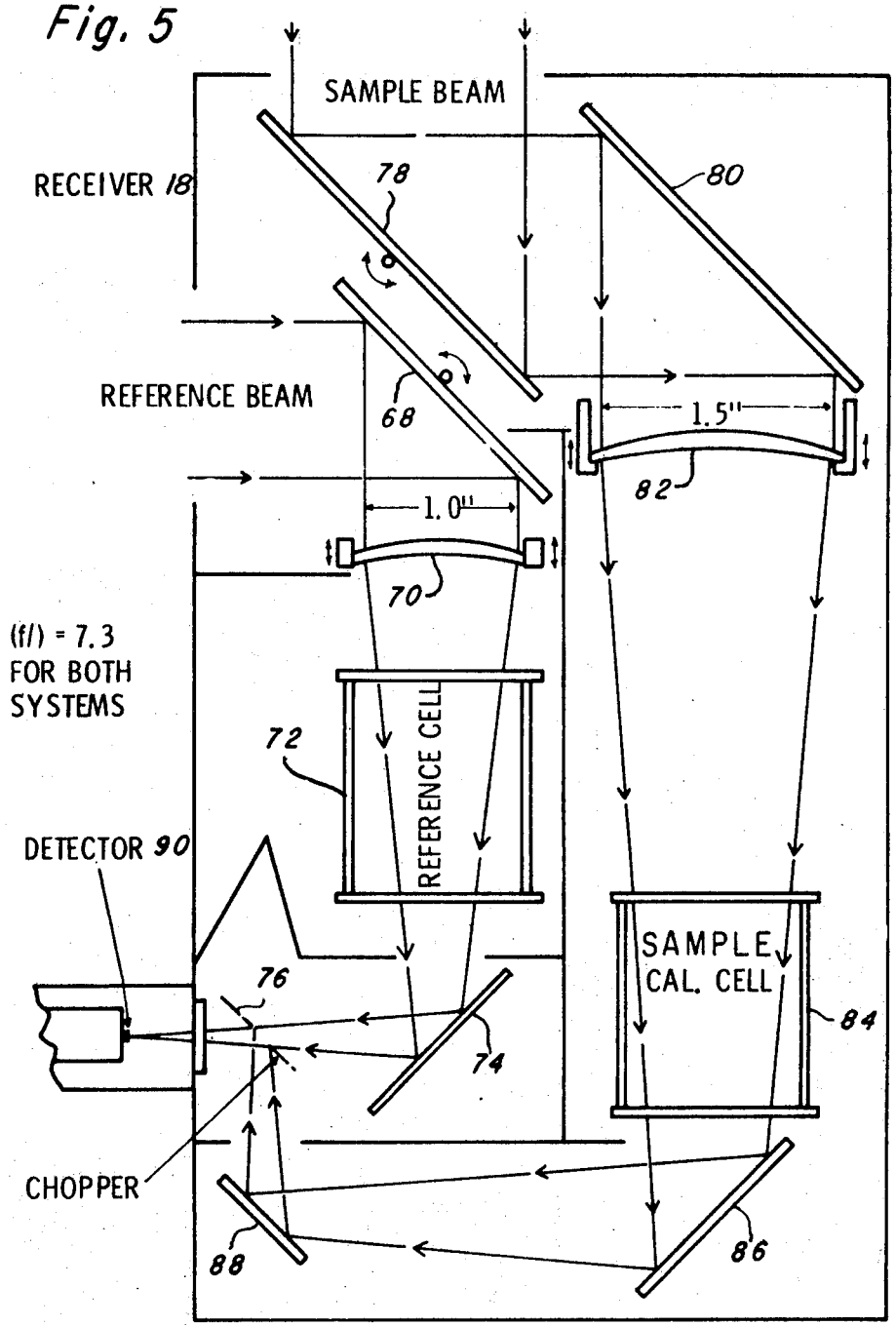
FIG. 5 is a side view taken partly in section of the receiver for the pollution monitoring system.
Figure 6D:
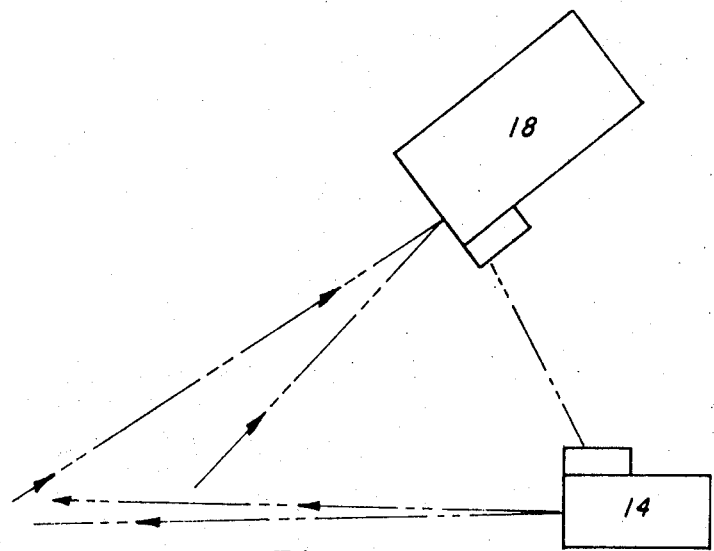

The sample path (FIG. 5) includes a reflective surface of a mirror 78 positioned to reflect light received from the beamsplitter 62 to another reflective surface 80. The reflective surface 80 (FIGS. 1 and 5) is positioned to further reflect the light from the beamsplitter 62 through a refractive element 82 having an aperture of about 1.5 inches and a high $f$/number ($\approx 7.5$), and through a removable sample calibration cell 84 to reflecting mirrors 86 and 88. The reflecting mirrors 86 and 88 are positioned one to the other so as to reflect light passing through the sample calibration cell 84 to the chopper 76. The sample calibration cell 84 may be constructed the same as the reference cell 72. The calibration cell contains a known amount of the pollutant and when inserted in the path will allow calibration of the instrument. Other sample path arrangements for absorptive techniques are possible. For example, the arrangements of FIGS. 6A and 6B include reflecting surfaces, such as, for example, corner reflectors 110 for returning unabsorbed light to the detector. In FIG. 6B, a sample cell 112 is used to contain a pollutant sample of unknown composition. The system's sample path can be adapted for scattering techniques as shown in FIGS. 6C and 6D. In scattering techniques the sample performs the reflective function and no reflective elements are required. It is essential, however, that the receiver 18 and transmitter 14 (FIGS. 6C and D) have overlapping fields of view.

Figure 1:
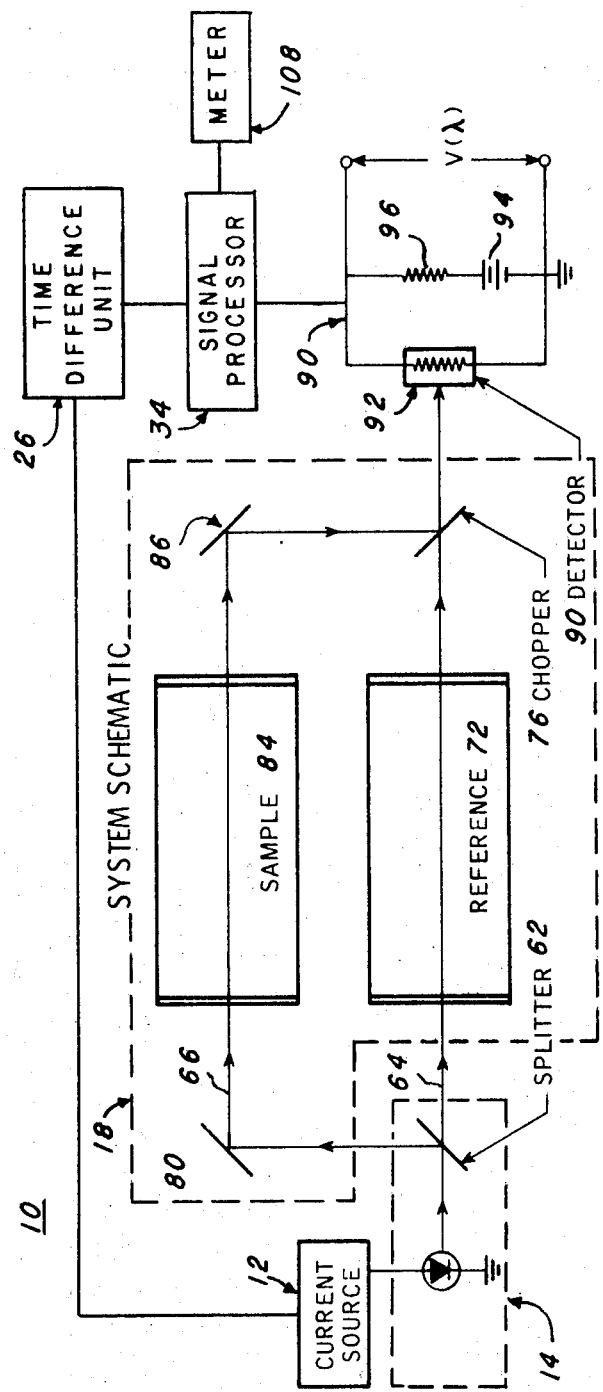
FIG. 1 is a schematic drawing of the pollution monitoring system embodiment of the invention.

Returning to FIG. 5, the chopper 88 alternately samples the light from the reference path and the sample path. The chopper 88 may be a circular disk having a plurality of openings separated by a plurality of closures arranged so as to alternately pass and block light from the reference path and to alternately block and pass light from the sample path. The light passed is detected by a detector 90 (FIGS. 1, 5, and 7). The detector 90 (FIGS. 1 and 5) may be a mercury cadimum telluride (Hg,Cd)Te detector 90 which converts light energy in the infrared spectrum to electrical energy in proportion to the light intensity for the signal processor 34 (FIG. 1).

The signal processor 34 (FIG. 7) includes a preamplifier 98 for amplifying the detector outputs to an intermediate level for further processing without appreciable degradation of the signal-to-noise ratio of the system. The output of the preamplifier is applied to a demodulator 100 for removing the high frequency carrier component while passing the chopper modulated signal to a second demodulator 102 for removing the chopper frequency from the signal which is now in the form of
$V(\lambda) = R\ [P_s(\lambda) - P_R(\lambda)] = RP(\lambda)\ \{\exp[-a(\lambda)C_s - a_p C_p - a_a(\lambda)C_a] - \exp[-a(\lambda)\ C_R]\}$, with $\lambda = \lambda_o + (\Delta\lambda) f(t)$ where $f(t)$ is a triangular wave.

The output of the second demoudlator 102 is applied to the previously mentioned time difference circuit for the diode laser drive circuit and, for example, to a differentiator 104, which may be a simple RC unit optimized for the line shaped and triangular wave frequency to remove to first order the $P(\lambda)$ term, suppressing linear attenuation factor of particulates, and suppressing nearby unwanted correlated noise such as lines of $H_2O$ and $CO_2$. The output of the differentiator 104 is applied to a peak detector 106 to determine the amplitude of the differentiated voltage. This amplitude of the differentiated voltage is proportional to the difference in absorption strengths of the contaminant in the reference and sample path. The peak voltage is applied to a galvonometer type meter 108 having a scale calibrated to display the concentration of the contaminant in the sample.

For cases where the light attenuation is high (about 10%) a logarithmic amplifier 101 (shown in dotted lines) is used after the high frequency carrier demodulator 100. It is essential that it be placed at this point since the demodulator 100 establishes a zero signal reference which is required for proper operation of the logarithmic amplifier. For this case the signal after the second demodulator 102 is now in the form $V(\lambda) = \ln\ \{RP(\lambda) \exp[-a(\lambda)\ C_s - a_p C_p - a_a(\lambda)\ C_a]\}$
$-\ln\ \{RP(\lambda) \exp[-a(\lambda)\ C_R]\}$
$= -a(\lambda)\ [C_s - C_R] - a_p C_p - a_a(\lambda)\ C_a$ The output of the second demodulator 102 is applied in the same manner as before. The differentiator 104 now does not need to remove the $P(\lambda)$ term but suppresses linear attenuation factors of particulates and nearby unwanted correlated noise factors such as lines of $H_2O$ and $CO_2$.

In operation a reference cell containing a known concentration of a selected contaminant such as NO, $SO_2$, or $SO_3$ ans a sample to be processed are inserted into the system. The tunable diode laser is tuned, by adjusting the diode laser drive circuit, to lock onto the center of the absorption line of a contaminant such as sulfur dioxide which has many absorption lines in the 8.9 micrometer wavelength region, one of which is located at 1,133 $cm^{-1}$. The sample is then processed by a continuous scan method.

The continuous scan method uses the continuous scan capability of the diode laser to scan an entire absorption line. This is possible because tri-atomic molecules have line shapes having half-widths of about 0.1 to 0.2 $cm^{-1}$ when they are at atmospheric pressure. In a single mode, the diode laser can scan as much as 0.4 $cm^{-1}$. Thus, the emission frequency of the diode laser is varied to scan an entire absorption line in a continuous fashion. In scanning the sample, uncorrelated noise (detector or electronic noise) and correlated noise (absorption signals produced by other tri-atomic molecules ($H_2O$ or $CO_2$) which have nearby absorption lines) are present. The ideal situation is to have a high signal-to-noise ratio with the uncorrelated noise being the dominant noise factor. As the sensitivity of system is 1 part per $10^9$ per meter for a gas such as $SO_2$, some signal to uncorrelated noise can be lost to suppress the correlated noise.

To demonstrate the effectiveness of the system a sample containing $SO_2$ and water was used with the combination of line strength and concentration made equal to each other to give an equal peak attenuation factor. The lines of $SO_2$ and water are respectively centered at 1,133 and 1,134 $cm^{-1}$. By differentiating the signal with respect to time where there was a one to one correspondence between laser emission wavelength and time, a rejection of the correlated (water) noise was about $10^5$ fold. That is the attenuation at 1,133 $cm^{-1}$ due to the band at 1,134 $cm^{-1}$ was $10^5$ lower than that due to the band at 1,133 $cm^{-1}$. For comparison, the rejection for the same sample using the simple scan method was only four hundred fold. Diffentiation improved the ratio of signal to correlated noise by almost a factor of $10^3$ for the example used, while decreasing the ratio of signal to uncorrelated noise by about 25 fold. The decrease in the signal to uncorrelated noise is acceptable as the original postpreamp sensitivity is 1 part per $10^9$ per meter.

Although preferred embodiments of the present invention have been described in detail, it is to be understood that various changes, substitutions, and alterations can be made therein without departing from the scope of the invention as defined by the appended claims.

What is claimed is:
1. Apparatus for monitoring atmospheric pollution comprising:
   a. A tunable laser diode arranged to emit light of a selected pollutant's absorption band into a reference path and a samplepath;
   b. An electrical source connected to supply a dc and an ac current to said tunable laser diode for respectively centering the emission of the tunable diode laser at the center of the pollutant's absorption band and changing the emission wave length back and forth through the absorption band;
   c. A reference cell containing an atmospheric pollutant positioned in the reference path of the light emitting means, said reference cell operative to absorb light proportional to the concentration of the pollutant;
   d. A light chopper positioned in the light reference path and the light sample path for alternately passing light from the reference path and sample path;
   e. A light detector means operatively responsive to light passing the light interrupting means to produce electrical representations thereof indicative of the light passing through the reference path and the sample path;
   f. A signal processing means operatively responsive to the electrical output of the light detector for producing a signal proportional to the difference in absorption strengths of the pollutant in the reference and sample paths;

g. An automatic lock feedback means operatively responsive to the signal processing means for feeding back a correction signal to the energizing means for locking the light emission wavelength at the center of the selected absorption band; and h. a display means operatively responsive to the signal processing means output for displaying the concentration of the pollutant.

2. Apparatus for monitoring atmospheric pollution comprising:

a. A coherent light emitting means for emitting light of a selected pollutant's wavelength through a light reference path and a light sample path having a pollutant sample therein;

b. A reference cell containing a light absorbing pollutant of known concentration positioned to absorb light in the light reference path;

c. A detector means operatively responsive to light passing from the light reference path and the light sample path for producing electrical signal representations thereof; and d. An electrical signal processing means operatively responsive to the outputs of the detector means for producing lock-on signals coupled to the coherent light emitting means for maintaining the light emission wavelength at the center of the pollutant's absorption band, and signals indicative of pollutant concentration for display.

3. Apparatus according to claim 2, wherein said coherent light emitting means is a tunable diode laser tuned to emit light having an absorption bandwidth substantially that of a selected light absorbing pollutant.

4. Apparatus according to claim 2, wherein said light emitting means comprises a drive current producing means for the coherent light emitting means having a d.c. source for producing a d.c. level component for centering the light emission wavelength at the center of a pollutant absorption band, and an ac source for producing a low frequency ac component for scanning the light emission wavelength linearly through the absorption band, a summing amplifier for combining the d.c. and a.c. signals and a modulator means modulating the combined d.c.-a.c. signals for producing a drive current for the coherent light emitting means.

5. Apparatus according to claim 2, further including a sample cell containing a light absorbing sample positioned to absorb light in the light sample path.

6. Apparatus according to claim 2, further including a light interrupting means positioned in the light reference path and the light sample path for alternately passing light therefrom to the detector.

7. Apparatus according to claim 2, wherein said signal processing means includes a differentiator operatively responsive to the electrical output of the detector for suppressing therefrom any signals representing particulates, and nearby interfering absorption bands, and a peak detector operatively responsive to the differentiator output for determining the amplitude of the differentiated voltage.

8. Apparatus according to claim 4, wherein said signal processing means further includes an electrical feedback means operatively responsive to the output of the electrical signal processing means for producing a dc correction voltage coupled to the summing amplifier of the drive current producing means whereby the light emitter means are locked onto the center line frequency of a selected pollutant absorption band.

* * * * *